United States Patent Office 3,333,974
Patented Aug. 1, 1967

3,333,974
WATER RESISTANT PLASTERS
Allan Ellis Sherr, Norwalk, Conn., assignor to American Cyanamid Company, Stamford, Conn., a corporation of Maine
No Drawing. Filed Nov. 16, 1964, Ser. No. 411,599
8 Claims. (Cl. 106—109)

This invention relates to plaster compositions and more particularly to methods for improving calcium sulfate plaster mixes of the type of gypsum plaster or stucco, mixes for wall board manufacture and the like. The principal calcium sulfate plaster-forming materials are calcium sulfate hemihydrate obtained by calcining either rock gypsum or by-product calcium sulfate, dead burned gypsum or Keene's cement, and mixtures of the two.

A wide variety of objects in addition to wall board are molded from calcium sulfate hemihydrate or plaster of Paris or its mixture with Keene's cement, with or without the incorporation of fillers such as wood flour and the like. Such molded objects have fairly good strength, but are quite water-absorptive; i.e., they undergo a material gain in weight when immersed in or drenched with water.

It is a principal object of the present invention to provide a method for reducing the water absorption of calcium sulfate plasters.

It is a further object to provide plaster compositions having improved resistance to water absorption but without substantial deleterious effect on the appearance, color or other desirable properties of molded objects prepared from the compositions.

These and other objects and advantages of the invention will be apparent from the more detailed explanation which follows.

In accordance with the present invention small quantities of aromatic isocyanates and diisocyanates are incorporated uniformly into calcium sulfate plasters. It has been found that an appreciable reduction in the water absorption of coatings or objects molded from plaster of Paris is obtainable when as little as about 0.1% by weight, based on the dry weight of the plaster, of such isocyanates is incorporated into the plaster. From this minimum the quantities of aromatic isocyanate or diisocyanate suitable for use in practicing the invention may range upwardly to about 20% or more, based on the dry weight of the plaster. The preferred range is from about 0.25% to 10% by weight on the same basis. Larger quantities than 20% may be used, but are seldom advisable as above this level the increase in water resistance is not proportional to the further quantities of isocyanate added.

In its broadest aspect the present invention is a plaster comprising a susbtantially dry mixture of hydratable calcium sulfate and an aromatic isocyanate or aromatic diisocyanate in the desired proportions. This mixture may then be stored until the time for use at which point the desired amount of water is added in the manner of preparing ordinary plaster of Paris for coating or molding.

By "hydratable" calcium sulfate is meant calcium sulfate which may take on water of hydration or crystallization to attain the degree of hydration necessary to "set" (harden) the plaster composition, generally to at least the gypsum form, $CaSO_4 \cdot 2H_2O$. Plaster of Paris, $CaSO_4 \cdot \frac{1}{2} H_2O$, is the common form of "hydratable" calcium sulfate but the term obviously also includes water-soluble anhydrous calcium sulfate.

The amount of water to be mixed with the plaster and isocyanate is not critical and generally need only be enough to obtain a desired consistency, e.g., a putty-like consistency. The proportion of water, of course, will determine the fluidity and therefore the density of the mixture. For some applications it will be desirable to have a highly fluid mixture, as for example when spreading or spraying a very fine layer of the plaster mixture over a substrate such as a wall. In other applications less fluidity will be desirable, as for example, when patching holes or cracks in a wall or other surface. Generally, from about 20% to 75% of water, preferably from about 30% to 50%, based on the total weight of the composition including plaster, water, isocyanate and any other conventional additive, will be effective but larger and smaller amounts may also be useful for some applications.

The water-resistant plaster compositions are conveniently prepared by first mixing the hydratable calcium sulfate and aromatic isocyanate or diisocyanate to a uniform blend (prior to or at time of use) and thereafter adding an amount of water sufficient to obtain the desired consistency.

It will be appreciated from the foregoing that sequence of admixture is not critical except that the water and the aromatic isocyanates or diisocyanates should not be mixed in the absence of the calcium sulfate since the isocyanates react with water to form degradation products, such as carbamic acids and amines.

Numerous aromatic isocyanates and aromatic diisocyanates are known and are commercially available for use in the plaster compositions of this invention and include the phenyl, naphthyl and anthracyl isocyanates and diisocyanates wherein said aromatic groups are both substitued and unsubstituted.

Among the aromatic isocyanates may be mentioned:

phenyl isocyanate
p-bromophenyl isocyanate
p-nitrophenyl isocyanate
o-nitrophenyl isocyanate
o-bromophenyl isocyanate
o-chlorophenyl isocyanate
p-chlorophenyl isocyanate
α-naphthyl isocyanate
β-naphthylisocyanate
1-anthracyl isocyanate Among the aromatic diisocyanates may be mentioned:

2,4-tolylene diisocyanate
2,6-tolylene diisocyanate
diphenylmethane-4,4'-diisocyanate
p,p'-diphenylmethane diisocyanate
1,5-naphthalene diisocyanate
1,4-naphthalene diisocyanate
2,7-naphthalene diisocyanate
2-nitrophenyl-4,4'-diisocyanate
2-nitrodiphenylmethane-4,4'-diisocyanate
diphenylmethanesulfone-4,4'-diisocyanate
diphenylsulfone-4,4'-diisocyanate
m-phenylene diisocyanate
p-phenylene diisocyanate
isopropylidene bis(4-phenyl isocyanate)
4,4'-diphenylether diisocyanate

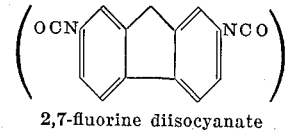

2,7-fluorine diisocyanate

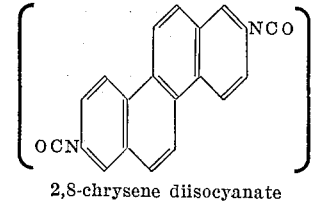

2,8-chrysene diisocyanate 4,4'-biphenylene diisocyanate
4,4'-methylene bis(2-chlorophenyl isocyanate)
3,3'-dimethyl-4,4'-biphenylene diisocyanate
3,3'-dimethoxy-4,4'-biphenylene diisocyanate

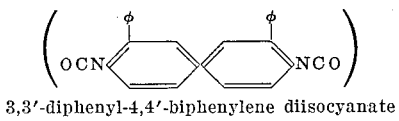

3,3'-diphenyl-4,4'-biphenylene diisocyanate

Many of the foregoing compounds as well as numerous other suitable compounds are disclosed in the literature. See, for example, Polyurethanes: Chemistry and Technology, volume 16, Part II, J. H. Saunders and K. C. Frisch, "Technology," Interscience Publishers, New York (1964), particularly page 309; U.S. Patents 2,284,637 and 2,818,404. These publications are incorporated herein by reference.

These compounds may be employed singly or in combination in the compositions of the present invention.

The water resistance of the plaster compositions of the present invention is a totally unexpected property since, as already mentioned, aromatic isocyanates and diisocyanates are known to react rapidly with water to form degradation products. In some manner the normal reactivity of the isocyanates with water is prevented. Likewise, it is not fully understood how the present compositions are rendered water-impermeable by the presence of the isocyanates. In this regard, it is thought that the isocyanates form a protective cover over the crystalline calcium sulfate material. Furthermore, as shown in the case of samples 17–20 of Table II herein, no improvement in water-resistance is effected by alkyl isocyanates. However, the invention is not limited by the foregoing considerations except as set forth in the appended claims.

An important advantage of the plaster compositions is their effectiveness in outdoor use where normal plaster would be subject to damage from rain and humidity. Thus, the present plaster compositions remain substantially water impermeable, that is, they show substantially less tendency to gain appreciably in weight when contacted with water or atmospheric moisture. In the case of conventional plasters, such moisture will cause the water-soluble materials in the plaster to wash out as well as excessive swelling and contraction.

The plaster compositions of the invention may be used as such or there may be added any of the conventional materials, such as set time retarders and accelerators, other water-proofing additives, plasticizers and the like. Among the retarding and accelerating additives may be mentioned the materials described in U.S. Patents 1,330,-058, 1,308,655 and 2,239,861. Plasticizing agents for plaster are disclosed in U.S. Patent 2,320,010 and auxiliary water-proofing agents are disclosed in U.S. Patents 2,112,302 and 1,967,275. The subject matter of these patents is incorporated herein by reference.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLES

*Preparation of water-resistant plaster compositions*

Test patties of the plaster compositions of this invention are prepared by charging the desired amount of plaster to a stainless steel cup. To this is added the desired quantity of aromatic isocyanate or diisocyanate. Thereafter the desired volume of water is added using a burette and the mixture is then allowed to stand for about 15 seconds. Thereafter it is stirred for about one minute and poured on to wax paper on a flat, level surface. The set time is measured from the time of dumping onto the wax paper until a Vicat needle will no longer penetrate the mixture and is reported in minutes. The set time can be conveniently controlled by proportions of the ingredients, particularly the water, or by additives. The average diameter of the test patties is measured carefully since it is indicative of the effect of the aromatic isocyanate or diisocyanate on the fluidity or consistency of the compositions. Fluidity may be controlled by the proportions of ingredients or by additives such as sodium lauryl sulfonate. The diameter is measured by averaging 4 to 6 diameters of each patty.

Water resistance is measured in the following manner: After each patty has set and dried to a constant weight, it is completely immersed in water at room temperature and removed briefly after certain periods of time for weighing to determine the amount of water absorbed. The water resistance is reported as the percent gain in weight after the prescribed period of immersion in water according to the following equation:

Percent gain in weight =

$$\frac{100(\text{wt. of patty, wet} - \text{wt. of patty, dry})}{\text{wt. of patty, dry}}$$

The following tables report set times, patty diameters and water resistance for several nonlimiting embodiments of the present invention:

TABLE I.—SAMPLES

|  | Blank | 1 | 2 | 3 | 4 | 5 | 6 | 7 | 8 |
|---|---|---|---|---|---|---|---|---|---|
| Molding Plaster,[1] parts | 50 | 50 | 50 | 50 | 50 | 50 | 50 | 50 | 50 |
| Water, parts | 35 | 35 | 35 | 35 | 35 | 35 | 35 | 35 | 35 |
| 2,4-tolylene diisocyanate, parts | 0 | 0.12 | 0.025 | 0.125 | 0.25 | 0.625 | 1.25 | 2.5 | 5 |
| Set time, minutes | 41 | 49 | 42 | 61 | 64 | 62 | 65 | 68 | 71 |
| Diameter of patty, inches | 5 | 4⅞ | 4⅝ | 4⅝ | 5 | 4 | 5⅛ | 5½ | 5¾ |
| Gain in weight after 97 hr. immersion in water, percent | 38 | 38.7 | 36.9 | 27.18 | 17.4 | 9.15 | 5.1 | 4.14 | 5 |

[1] Mixture of: 93.45% $CaSO_4 \cdot \tfrac{1}{2}H_2O$, 2.05% $CaSO_4 \cdot 2H_2O$, 1.66% excess $SO_3$, 2.49% other ingredient.

TABLE II.—SAMPLES

|  | Blank | 9 | 10 | 11 | 12 | 13 | 14 | 15 | 16 | 17 | 18 | 19 | 20 |
|---|---|---|---|---|---|---|---|---|---|---|---|---|---|
| Molding plaster,[1] parts | 50 | 50 | 50 | 50 | 50 | 50 | 50 | 50 | 50 | 50 | 50 | 50 | 50 |
| Water, parts | 35 | 35 | 35 | 35 | 35 | 35 | 35 | 35 | 35 | 35 | 35 | 35 | 35 |
| 4,4'-methylene-bis (phenylisocyanate), parts | 0 | 5 | 2.5 | 1.0 | 0.5 |  |  |  |  |  |  |  |  |
| 1-napthyl isocyanate, parts |  |  |  |  |  | 5 | 2.5 | 1.0 | 0.5 |  |  |  |  |
| n-butyl isocyanate, parts [2] |  |  |  |  |  |  |  |  |  | 5 | 2.5 | 1.0 | 0.5 |
| Set time, min | 48 | 60 | 60 | 57 | 60 | ca. 75 | ca. 75 | 47 | 54 | 57 | 54 | 60 | 57 |
| Diameter of patty, in | 4⅞ | 4⅞ | 4⅞ | 5 | 4¾ | 5⅙₆ | 5⅛ | 4¾ | 4¹³⁄₁₆ | 5¼ | 5⅜ | 5⅛ | 5⁹⁄₁₆ |
| Gain in weight after 96 hrs. immersion in water, percent | 38.2 | 8.8 | 17.5 | 32.9 | 31.7 | 7.4 | 20.4 | 34.6 | 35.9 | 38.4 | 39.6 | 37.2 | 38.7 |

[1] Mixture of: 93.45% $CaSO_4 \cdot \tfrac{1}{2} H_2O$, 2.05% $CaSO_4 \cdot 2H_2O$, 1.66% excess $SO_3$, 2.49% other ingredient.
[2] For comparison.

The tables show the substantial improvement in the water resistance of the plaster patties by the inclusion of the aromatic isocyanates and diisocyanates as compared to the gain in weight of the plaster patties lacking these additives or containing an alkyl isocyanate (Table II, samples 17–20). Moreover, it will be seen that set time is substantially increased for some compositions of the invention, e.g., samples 3–14.

I claim:

1. A method of reducing the water absorption of calcium sulfate plasters which consists essentially in incorporating therein an effective amount of a compound selected from the group consisting of aromatic isocyanates and aromatic diisocyanates.

2. A method of reducing the water absorption of calcium sulfate plasters which consists essentially in incorporating therein an effective amount of 2,4-tolylene diisocyanate.

3. A method of reducing the water absorption of calcium sulfate plasters which consists essentially in incorporating therein an effective amount of 4,4′-methylene-bis(phenylisocyanate).

4. A method of reducing the water absorption of calcium sulfate plasters which consists essentially in incorporating therein an effective amount of 1-naphthylisocyanate.

5. Water-resistant calcium sulfate plaster comprising a mixture of hydratable calcium sulfate and an effective amount of a compound selected from the group consisting of aromatic isocyanates and aromatic diisocyanates.

6. Water-resistant calcium sulfate plaster comprising a mixture of hydratable calcium sulfate and an effective amount of 2,4-tolylene diisocyanate.

7. Water-resistant calcium sulfate plaster comprising a mixture of hydratable calcium sulfate and an effective amount of methylene-bis(phenylisocyanate).

8. Water-resistant calcium sulfate plaster comprising a mixture of hydratable calcium sulfate and an effective amount of 1-naphthylisocyanate.

References Cited
UNITED STATES PATENTS

| | | | |
|---|---|---|---|
| 2,284,895 | 6/1942 | Hanford et al. | 260—453 |
| 2,818,404 | 12/1957 | Hill | 260—453 |
| 2,902,388 | 9/1959 | Szukiewicz | 106—90 |
| 2,959,489 | 11/1960 | Wagner | 106—90 |

TOBIAS E. LEVOW, *Primary Examiner.*

S. E. MOTT, *Assistant Examiner.*